United States Patent [19]
Brown

[11] 3,867,628
[45] Feb. 18, 1975

[54] PULSED LIGHT RECEIVER AND METHOD

[75] Inventor: Roger M. Brown, Mountain View, Calif.

[73] Assignee: Scientific Technology Incorporated, Mountain View, Calif.

[22] Filed: July 30, 1973

[21] Appl. No.: 383,786

[52] U.S. Cl.............................. 250/206, 250/214
[51] Int. Cl. ......................................... H01j 39/12
[58] Field of Search ........... 250/199, 206, 214, 222, 250/221; 307/311

[56] References Cited
UNITED STATES PATENTS

| | | | |
|---|---|---|---|
| 3,240,944 | 3/1966 | Wolfson | 240/214 |
| 3,463,928 | 8/1969 | Murphy | 307/311 |
| 3,527,949 | 9/1970 | Huth | 250/199 |
| 3,534,351 | 10/1970 | Harnden | 250/221 |
| 3,576,452 | 4/1971 | Smith | 307/311 |
| 3,654,478 | 4/1972 | Fuwa | 250/206 |
| 3,684,898 | 8/1972 | Wood | 307/311 |

Primary Examiner—Archie R. Borchelt
Assistant Examiner—D. C. Nelms
Attorney, Agent, or Firm—Flehr, Hohbach, Test, Albritton & Herbert

[57] ABSTRACT

A receiver for pulsed light having a sensing means providing an electrical output responsive to said light. Means are provided for additionally controlling the electrical output to a point of optimum light sensitivity through application of an electrical input. Optimum sensitivity is set at a constant level in the absence of light input by said electrical input. Means are provided for rejecting the effects of light inputs on the electrical output for pulse frequencies contained in received light pulses which are below a predetermined frequency and for accepting pulse frequencies contained in received light pulses which are above said predetermined frequency.

23 Claims, 9 Drawing Figures

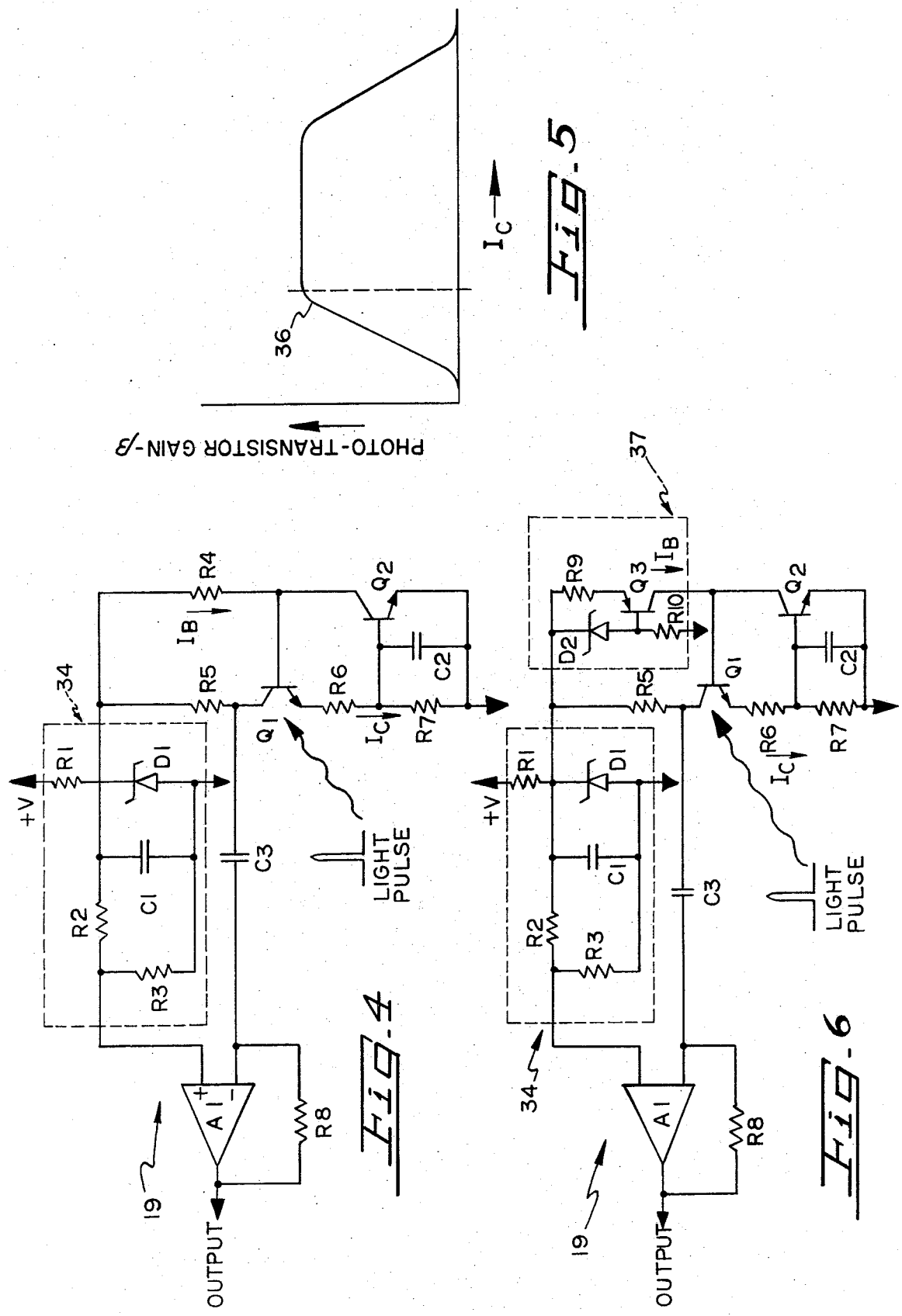

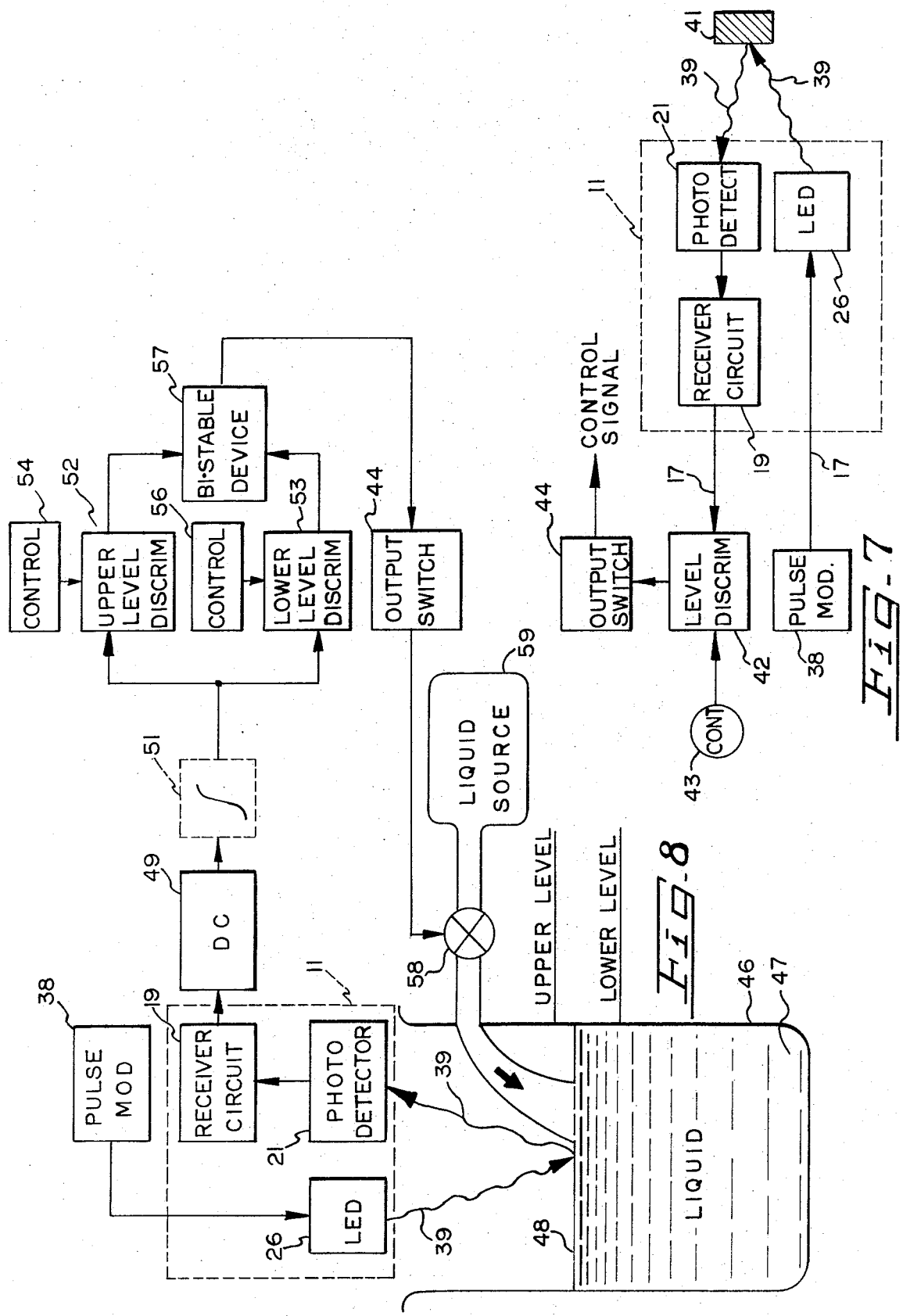

3,867,628

PULSED LIGHT RECEIVER AND METHOD

BACKGROUND OF THE INVENTION

This invention relates to a pulsed light receiver and method which is sensitive only to light pulse frequencies contained in received light pulses which are above a predetermined pulse frequency, and more particularly to such a receiver and method having maximum and constant sensitivity to such pulsed light under all conditions of ambient light from total darkness to bright sunlight.

Pulsed light systems for determining the presence or the range of an object have inherent advantages over continuous light systems. Pulsed light systems are more stable and exhibit less sensitivity to changes in ambient light conditions.

Light sensors often use photo-transistors to detect light either directly from a light source or light reflected from an object illuminated by the light source. Circuits using photo-transistors often have slow response time, low sensitivity, are subject to saturation by ambient light, and display a widely varying sensitivity. Moreover, the output from systems using photo-transistors is subject to temperature variation, electrical interference, and variation in the power supply voltage output.

It is apparent that a light sensitive system is needed having the characteristics of optimum constant sensitivity to discrete pulse frequencies of light radiation, optimum response time, and insensitivity to ambient light. Freedom from output temperature variation, electrical interference, and the effect of power supply voltage fluctuations is also needed.

SUMMARY AND OBJECTS OF THE INVENTION

The pulsed light receiver disclosed herein contains a light sensitive element which produces an electrical output due to either a light input or an electrical input. The electrical input is utilized to set the output of the photosensitive device to a predetermined level in the absence of a light input. The electrical output is held at a constant level in the presence of any pulse frequencies contained in received light inputs which are below a predetermined pulse frequency. This rejection of all light input signal components which are below a predetermined pulse frequency is not operative for pulse frequencies above the predetermined pulse frequency which may be contained in the received light inputs. A low load impedance is presented to the electrical output so that the fastest response time of the photosensitive device and the circuit is obtained. This allows transmitted light pulse widths to be as short as possible. Higher pulse peaks with shorter pulse widths decrease power dissipation in the light source providing greater range in the pulsed light receiver.

In general it is an object of the present invention to provide a pulsed light receiver which is sensitive to pulse frequencies contained in a received light pulse above a predetermined pulse frequency and insensitivt to those pulse frequencies below the predetermined pulse frequency.

Another object of the invention is to provide a pulsed light receiver of the above character which has a constant sensitivity over wide variations of ambient light intensity.

Another object of the invention is to provide a pulsed light receiver of the above character which detects range from the source of light pulses.

Another object of the present invention is to provide a pulsed light receiver of the above character which utilizes optimum response characteristics of the photosensitive device.

Another object of the invention is to provide a pulsed light receiver of the above character with minimum sensitivity to electrical interference or variations in temperature or the output of the power supply.

Additional objects and features of the invention will appear from the following description in which the preferred embodiment has been set forth in detail in conjunction with the accompanying drawings.

BRIEF DESCRIPTION OF THE DRAWINGS

FIG. 4 is a circuit diagram of one embodiment of the pulsed light receiver.

FIG. 5 is a diagram of collector current characteristic for a typical photo-transistor used in the circuit of FIG. 4.

FIG. 6 is a circuit diagram of another embodiment of the pulsed light receiver.

FIG. 7 is a block diagram of a system in which the pulsed light receiver may be used.

FIG. 8 is another block diagram of a system in which the pulsed light receiver may be used.

DESCRIPTION OF THE PREFERRED EMBODIMENTS

Figure 1:
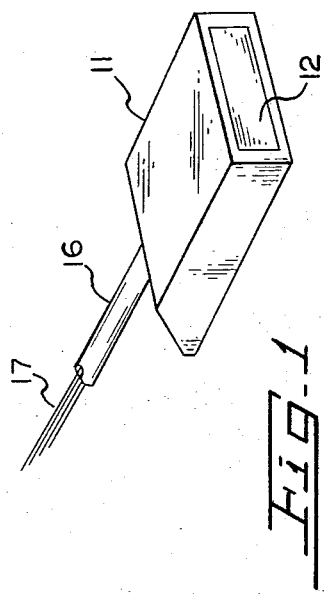
FIG. 1 is a front isometric view of the pulsed light receiver.

The pulsed light receiver of FIG. 1 is a combination of mechanical and electrical components which performs the function of a sensitive and stable receiver for electromagnetic radiation pulses of short dwell time. One embodiment of the disclosed device contains a receiver only, and another embodiment contains both the transmitting electromagnetic radiation pulse source and the electromagnetic radiation pulse receiver.

Electromagnetic radiation may be of any wavelength to which the photo-sensitive device responds. The range may extend from the ultraviolet through the visible spectrum into the infrared. All such radiation is interchangeably referred to as "light" or "electromagnetic radiation" throughout this disclosure.

Figure 2:
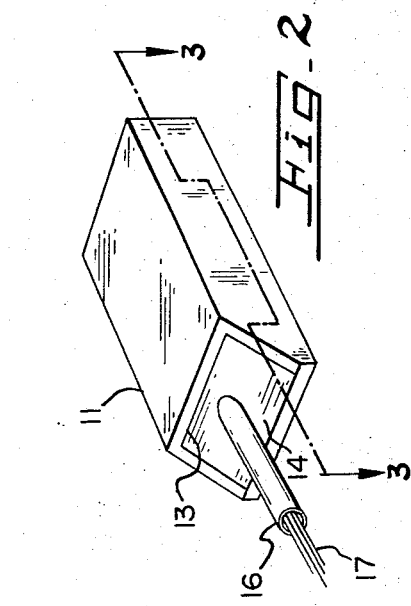
FIG. 2 is a rear isometric view of the pulsed light receiver.

The envelope of the pulsed light receiver may take the form of that shown in FIG. 1. An outer case 11 has a frontal opening in which is disposed optical means such as a colored window 12 for passing the pulsed electromagnetic radiation and for providing partial blocking or rejection of ambient electromagnetic radiation. Case 11 has a rear opening 13 as best seen in FIG. 2 through which potting 14 is introduced into the interior of case 11 for isolating the internal structure from the surrounding ambient atmosphere. A cable 16 exits through the rear surface of the potting 14 carrying multiple conductors 17 by which electrical signals are delivered to and from the contained circuitry.

Figure 3:
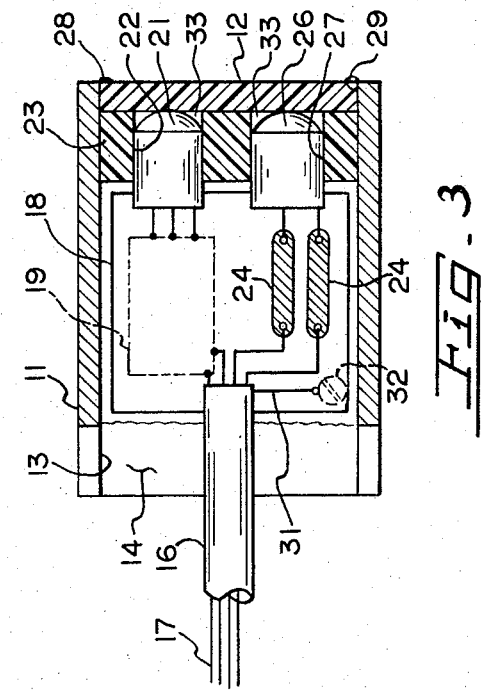
FIG. 3 is a sectional view of the pulsed light receiver along the line 3—3 of FIG. 2.

The sectional view of FIG. 3 shows cable 16 entering through the rear opening 13 of case 11 carrying conductors 17 which are attached to points on a circuit board 18. In the embodiment containing both pulsed light transmitting means and pulsed light receiver means a twisted shielded pair of conductors 17 is connected to a receiver circuit 19. A photo-transistor 21, in this embodiment, has electrical connections from a base, an emitter, and a collector to the receiver circuit 19. The photo-transistor 21 is positioned in a bore 22 in an opaque holder 23 mounted behind the window 12.

A separate twisted pair of shielded conductors 17 is connected to conductive paths 24 on circuit board 18 which are in turn connected to the electrical terminals of a pulsed light producing source 26. Pulsed light source 26 may be a light emitting diode (LED). LED 26 is mounted in a bore 27 in opaque holder 23 also behind window 12.

Window 12 has a front edge bevel 28 for accommodating a seal 29 between bevel 28 and the front internal edge of case 11. The shields in cable 16 are brought through a conductor 31 to a screw 32 in case 11 for grounding. It may be seen that when the case 11 with the above-mentioned components assembled internally is filled with potting 14 in the absence of moisture, the spaces 33 between photo-transistor 21 and LEd 26 will not contain enough moisture to condense on the internal surface on window 12 during low temperature operation. Condensation of moisture on window 12 would partially block passage of pulsed light from LED 26 to an object located externally of case 11, and would partially block reflective light pulses from the object to photo-transistor 21.

A circuit diagram of the receiver circuit 19 is shown in FIG. 4. The power supply is represented by +V and is connected to a voltage regulator and filter 34 at the receiver circuit input. Voltage regulator and filter 34 is of a conventional design containing resistor R1 in series with a zener diode D1 connected between R1 and ground. A regulated voltage is obtained across zener diode D1 depending upon the characteristics thereof. Resistor R2 is on the input to an amplifier A1 and resistors R3 and capacitors C1 provide for filtering of power supply disturbances to remove them from the input of amplifier A1. Amplifier A1 has a feedback resistor R8 to the inverting terminal of amplifier A1 providing a configuration, commonly known as a current to voltage converter.

Regulated voltage from the voltage regulator 34 is connected through resistor R5 to the collector of a photo-sensitive device such as photo-transistor Q1. The regulator voltage is also connected through resistor R4 to the base connection of photo-transistor Q1. The emitter of Q1 is connected through a resistor R6 in series with a resistor R7 to ground potential. A connection is made at a point in the circuit between resistors R6 and R7 to the base of a transistor Q2. The base of transistor Q2 has a capacitor C2 connected between the base and ground. The emitter of transistor Q2 is also connected to ground. The collector of transistor Q2 is connected to the base connection of photo-transistor Q1. The output from photo-transistor Q1 is taken from the collector and coupled through capacitor C3 to the inverting terminal of amplifier A1.

The circuit of FIG. 4 operates in the following manner. Resistor R4 is of a very high value, in the order of several megohms, and serves to bias photo-transistor Q1 to the "on" condition in conditions of darkness or complete absence of electromagnetic radiation inputs. With photo-transistor Q1 turned on, a base to emitter current $I_B$ flows, and a larger current $I_C$ will flow in the emitter-collector circuit of Q1. Current $I_C$ causes a drop across resistor R7 which biases transistor Q2 to a more conductive condition as $I_C$ increases and the drop across resistor R7 increases. In this configuration transistor Q2 can be seen to form a feedback path between the emitter and base of photo-transistor Q1 providing negative feedback to the control of Q1.

The light pulses which are produced by the pulsed light source 26 contain pulse frequency components which are substantially all above a predetermined frequency. The pulses have a rise time and a dwell time both of which have a predetermined maximum time duration for the purpose of assuring that only those pulse frequency components above the predetermined frequency are present. These pulses may be referred to as "fast" pulses. By way of example, pulse widths of 10 to 20 microseconds have been used which ideally have a shape approaching that of a square wave. In that which follows the predetermined frequency mentioned refers to the lowest sinusoidal pulse frequency component contained in the light pulse. This is not to be confused with pulse repetition rate frequency.

Capacitor C2 in conjunction with resistor R7 forms a low pass filter circuit which attenuates signals at a frequency above the predetermined frequency by providing a low impedance or shunt path through C2 to ground. Thus signals above the predetermined frequency are by-passed at the base of transistor Q2 blocking feedback to the base of photo-transistor Q1. Therefore, light pulse frequency components above the predetermined frequency received by photo-transistor Q1 cause output to appear at the collector of Q1 which is not compensated by the feedback path through transistor Q2. Conversely, output signals are attenuated for frequency components below the predetermined frequency. This output from Q1 for light pulse inputs above the predetermined frequency is capacitor coupled through capacitor C3 to the inverting input of amplifier A1. Capacitor C3 is configured to present a low impedance of Q1 output for frequency components contained in the output pulse above the predetermined frequency and to provide a high impedance to outputs below the predetermined frequency, thus providing additional rejection or attenuation of output from photo-transistor Q1 caused by ambient light inputs at all frequencies below the predetermined frequency.

The physical location of the receiver circuit 19 inside the case 11 provides shielding from electrical interference which might be otherwise induced in the receiver circuitry by stray electrical fields. The conductors 17 are also shielded from noise induced by radio frequency interference and the shields are placed at the same ground potential as the case 11.

As seen in FIG. 4 photo-transistor Q1 is biased to an "on" condition by the base current $I_B$ through high resistance R4. FIG. 5 shows a typical gain or beta/collector current characteristic curve for readily available photo-transistor devices such as Q1. Q1 in this embodiment is biased electrically to the "on" condition at a point 36 representing the "knee" of the beta/collector current curve. As FIG. 5 shows, a minimal increase in light input causes a large increase in collector current when the device is operating at point 36 due to the highest available value of beta or gain at and just above point 36. This places the photo-transistor Q1 at its optimum sensitivity point.

A pulsed light receiver is thus provided which is biased to its point of greatest sensitivity in the absence of electromagnetic radiation or light. The effects of ambient light pulse frequency components below a predetermined frequency are fed back to the control of the light sensor to maintain a constant output therefrom. Light pulse frequency components reaching the photo-sensor which are above the predetermined frequency are by-passed from the input of the feedback path allowing photo-sensor output to be generated. The output is delivered to a low impedance load so that the fastest response time of the light sensitive means may be utilized.

The receiver circuit of FIG. 6 is identical in most respects to that of FIG. 4 and like circuit elements have identical item indicators. The distinction lies in the replacement of resistor R4 of FIG. 4 with the constant current source 37 in FIG. 6. The base circuit of photo-transistor Q1 must contain high impedance which must be constant to bias Q1 to the "on" condition at 36 noted in FIG. 5. This condition of maximum sensitivity is obtained using the well known configuration at 37 for the constant current source of FIG. 6. As in the case of FIG. 4 above, Q1 is biased to an "on" condition in the absence of ambient light by constant current source 37 as it supplies base current, $I_B$, causing collector current, $I_C$, to flow. Collector current $I_C$ produces a voltage drop across resistor R7 turning on transistor Q2. Transistor Q2 sinks part of the base current $I_B$ limiting the base current to the base emitter junction of Q1. The circuit comes to equilibrium in one configuration with approximately a 0.5 volt drop across resistor R7. Any desired value of $I_C$ may be set by the choice of resistor R7.

As ambient light increases, photon generated current in Q1 tends to increase $I_C$. A larger drop in voltage across resistor R7 occurs increasing the bias on transistor Q2 causing a larger Q2 collector current. In this manner, transistor Q2 sinks the photon generated current at the base of photo-transistor Q1 keeping Q1 collector current $I_C$ constant. Light pulse input frequency components above a predetermined frequency, as set by the filter comprising resistor R7 and capacitor C2, will produce an output from photo-transistor Q1 as described above in the description of FIG. 4 operation.

In pulsed light systems it is desirable to use a light pulse width as narrow as possible to minimize power consumption of the system and power dissipation in the light source. In most devices commonly used for light sources, such as LED's, the shorter the duration of the light pulse the greater the peak light pulse output, allowing range or a greater sensitivity in the system. As mentioned above, the disclosed system has been constructed utilizing narrow light pulses of 10–20 microsecond widths. The pulse separation may vary from 100 microseconds to 100 milli-seconds. The high repetition rate is used for those applications where fast system response time is required, such as in an application where a fast moving object must be detected as it passes through the receiver detection field. The low repetition rates are used for those applications where object discrimination is not as important, and where long range is desired requiring high peak light pulses from the light source. While the light source, such as LED 26 in FIG. 3, is not a part of the pulsed light receiver circuitry, its physical placement in the configuration of FIG. 3 is considered a part of this invention. The opaque holder 23 for the LED 26 and the photo-transistor 21 prevents direct transmission of light from the former to the latter. It should also be noted that window 12 may be of a red transparent material which passes the light pulses from LEd 26 but rejects or absorbs some ambient light, such as flourescent type light.

FIG. 7 shows a system which could utilize the pulsed light receiver. A signal from a pulse modulator 38 is conducted to the LED 26 through conductors 17. A light pulse 39 is shown emanating from LED 26 and impinging on an object 41. The light pulse 39 is reflected from object 41 to a photo-detector such as photo-transistor 21. Photo-detector output is connected to receiver circuit 19 which produces an output having an amplitude which is a function of the distance from object 41 to photo-transistor 21. The output of circuit 19 is conducted through conductors 17 in cable 16 to a level discriminator 42. Level discriminator 42 has a control 33 for setting a desired level. When the preset level in discriminator 42 is exceeded by the output from circuit 19 level discriminator 42 produces a signal which is directed to an output switch 44 for producing a control signal. The system just described is similar to the photo-electric apparatus and system disclosed in copending application Ser. No. 338,179, filed Mar. 5, 1973.

By way of example another application for the pulsed light receiver exists in the system of FIG. 8. A liquid tank 46 containing liquid 47 has an upper surface 48 the level of which is monitored by the pulsed light receiver. As in the example of FIG. 7 a light pulse 39 is transmitted from LED 26 and reflected from surface 48 to photo-transistor 21. The output of photo-transistor 21 is delivered to receiver circuit 19 and conducted to means 49 for producing a DC signal proportional to the amplitude of the pulses from receiver circuit 19. Pulses from receiver circuit 19 have a larger amplitude when surface 48 is closer and a smaller amplitude when surface 48 is farther away from photo-transistor 21. An optional integrator 51 may follow means 49 for the purpose of averaging out short term variations in the DC signal. The averaged DC signal is delivered to an upper level discriminator 52 and a lower level discriminator 53. Both upper and lower level discriminators 52 and 53 have controls 54 and 56 respectively for setting the input level at which an output signal is generated. A bistable device 57 receives the outputs from upper and lower level discriminators 52 and 53 and produces an output conducted to output switching device 44.

The DC level from means 49 when falling below a certain level actuates lower level discriminator 53 as set by control 56, producing an output from bistable device 57 which actuates output switch 44 to energize a valve 58 for introducing fluid from a liquid source 59 into tank 46. In the same fashion, when the DC level from means 49 exceeds a certain value, upper level discriminator 52, as set by control 54, sets bistable device 57 to produce a predetermined output. This latter output sets output switch 44 to close the valve 58 blocking entry of liquid from source 59 to tank 46. The level in tank 46 is held in this manner between the upper and lower levels indicated on the side of tank 46 in FIG. 8.

Figure 9:
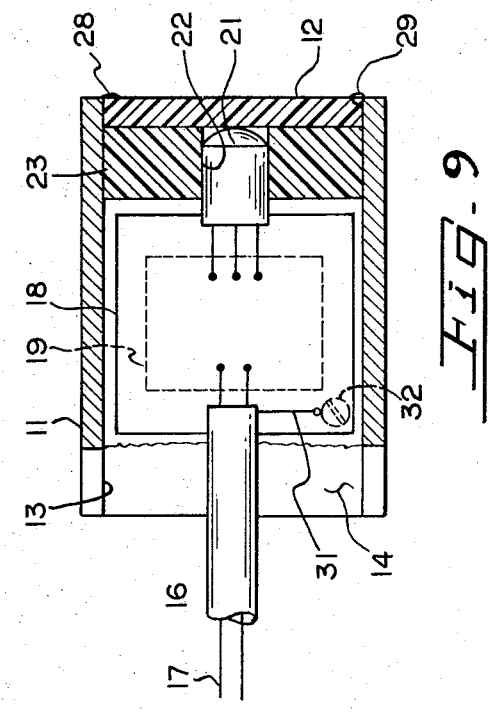
FIG. 9 is a sectional view of another embodiment of the pulsed light receiver similar to that of FIG. 3.

The foregoing has been a description of the pulsed light receiver configuration containing a pulsed light source such as LED 26. FIG. 9 shows a configuration of the pulsed light receiver identical to that of FIG. 3 except for the deletion of LED 26. Like elements have been assigned like item numbers in FIG. 9. The receiver of FIG. 9 may be used where the light source is carried outside the case 11 such as the application where a light source is aimed directly at the window 12 of the receiver for the purpose of detecting the presence of objects which may obstruct the pulsed light in the path from source to receiver. Such an application may be imagined in the counting of objects passing on a conveyor belt, where the objects do not have surfaces which are adequately reflective. It is apparent that in such an application where the object surfaces are adequately reflective, advantage would be seen in using the compactness and gaining the ranging capabilities of the installation in the embodiment of FIG. 3.

A method of receiving pulse frequency components in pulsed light above a predetermined pulse frequency has been disclosed which involves controlling the electrical output of a pulsed light sensor in the absence of any light inputs so that it is at its optimum point of sensitivity to light inputs. The method includes rejecting pulse frequency components in ambient light inputs which are below a predetermined light pulse frequency by feeding back the electrical output generated by ambient light inputs to the control of the light sensor for cancellation of the outputs produced thereby. The technique includes filtering of the feedback signal to prevent feedback signals from reaching the control input of the light pulse sensor when the light pulses are above the predetermined light pulse frequency. Presentation of a high impedance to the control of the light pulse sensor maintains the sensor at a constant and optimum sensitivity point. At low load impedance is presented to the output of the light pulse sensor for the purpose of obtaining the fastest sensor response time possible and also for the purpose of providing additional rejection of ambient light pulse inputs.

It is apparent that a pulsed light receiver and method has been disclosed which provides constant maximum sensitivity to pulsed light inputs above a predetermined frequency while rejecting ambient light inputs below the predetermined frequency. Moreover, the receiver circuit as a whole exhibits the optimum response characteristics of the photosensing device whereby minimum transmitted light pulse width may be used for increasing pulsed light receiver range.

I claim:

1. A receiver comprising means for producing an electrical output responsive to electromagnetic radiation input,
   an electrical control input terminal connected to said means producing electrical output,
   means connected to said electrical control input terminal for controlling said electrical output at a constant level in the absence of electromagnetic radiation input so that said means responsive to electromagnetic radiation is operated at optimum sensitivity,
   means for attenuating electrical output due to ambient electromagnetic radiation pulse frequency components below a predetermined pulse frequency component connected to said electrical control input terminal, and
   means for providing a low load impedance for said electrical output above said predetermined pulse frequency component so that the fastest response time of said means responsive to electromagnetic radiation may be utilized.

2. A receiver for receiving light pulses as in claim 1 wherein said means responsive to electromagnetic radiation comprises a phototransistor having a collector, an emitter and a base connection.

3. A receiver for receiving light pulses as in claim 2 wherein said means for controlling said electrical output comprises a constant current source connected to said base presenting a high impedance to said base connection.

4. A receiver for receiving light pulses as in claim 2 wherein said means for controlling said electrical output comprises a high resistance connected to said base.

5. A receiver for receiving light pulses as in claim 2 wherein said means for attenuating comprises feedback means between said emitter and said base connections whereby photo-transistor emitter-collector current controls base-emitter current.

6. A receiver for receiving light pulses as in claim 5 together with low pass filter means in parallel with said feedback means for shunting said means for attenuating pulse frequency components above said predetermined pulse frequency component.

7. A receiver for receiving light pulses as in claim 2 wherein said electrical control input terminal comprises said photo-transistor base and wherein said means for attenuating comprises
   a resistor connected to said photo-transistor emitter, and
   a transistor having base, collector and emitter terminals connected so that said transistor collector-emitter circuit is connected to said photo-transistor base and said transistor base is connected to said photo-transistor emitter,
   whereby photo-transistor emitter-collector current through said resistor serves to cause said transistor collector-emitter circuit to conduct a predetermined portion of said photo-transistor base current.

8. A receiver for receiving light pulses as in claim 7 together with a capacitor connected in parallel with said resistor providing a shunt path for by-passing said transistor base for said electrical output frequency components which are above said predetermined pulse frequency component.

9. A receiver for receiving light pulses as in claim 1 wherein said means for providing a low load impedance includes means for additional attenuation of ambient electromagnetic radiation inputs below said predetermined pulse frequency.

10. A receiver for receiving light pulses as in claim 9 wherein said means for additional attenuation is a capacitor coupling said output to an amplifier configured as a current to voltage converter.

11. A receiver for receiving light pulses as in claim 1 wherein said low load impedance comprises an amplifier configured as a current to voltage converter.

12. A receiver for receiving light pulses as in claim 11 together with a capacitor coupling said electrical output to said amplifier, said capacitor operating to provide additional attenuation of electrical output due to ambient electromagnetic radiation inputs below said predetermined pulse frequency.

13. A receiver for receiving light pulses as in claim 1 together with a case for containing the receiver, said case providing radiated interference shielding therefor and having an opening in one wall for allowing the pulsed light to pass.

14. A receiver for receiving light pulses as in claim 13 including,
    means for producing electromagnetic radiation pulses at a predetermined repetition rate,
    and pulses containing pulse frequency components above said predetermined frequency,
    and means for producing pulses adapted to be energized by an energy source,
    said pulses having a narrow width relative to said pulse repetition rate,
    whereby said pulses may attain a higher peak radiated energy output at a lower power dissipation thereby providing a greater range from the receiver at which an object may be positioned to reflect said pulses for reception and sensing by said means responsive to electromagnetic radiation.

15. A receiver for receiving light pulses as in claim 14 wherein said means for producing electromagnetic radiation pulses is a pulse modulator and said predetermined pulse repetition rate is higher for discrimination necessary when the object is within the receiver field for a short time, and said pulse repetition rate may be lower for adequate discrimination when the object is within the receiver field for a longer time.

16. A receiver for receiving light pulses as in claim 14 together with
    means for blocking direct transmission of electromagnetic radiation pulses from said means for producing pulses to said light sensitive means, and
    optical means positioned in said opening for passing said pulses and for further attenuation of some wave lengths in said ambient electromagnetic radiation.

17. A receiver for receiving light pulses as in claim 16 together with means for sealing said case for preventing the presence of internal moisture.

18. A receiver for receiving light pulses as in claim 13 together with optical means positioned in said opening for passing said pulses and for further attenuation of a part of said ambient electromagnetic radiation.

19. A receiver for receiving light pulses as in claim 18 together with means for sealing said case for preventing the presence of internal moisture.

20. A method of receiving light pulse frequency components above a predetermined pulse component frequency utilizing an electromagnetic radiation sensor having an electrical control comprising the steps of
    biasing the sensor to produce a constant output substantially at the optimum radiation sensitivity in the absence of electromagnetic radiation,
    attenuating sensor output due to ambient electromagnetic radiation pulse frequency components below the predetermined pulse component frequency by negatively feeding back the electrical output resulting therefrom to the electrical control of the sensor,
    filtering the feedback to prevent feedback signals above the predetermined pulse component frequency,
    and presenting a high impedance to the electrical control of the sensor to maintain the sensor at the optimum radiation sensitivity point.

21. A method of receiving light pulses as in claim 20 together with the steps of
    presenting a low load impedance to the output of the sensor to obtain the fastest sensor response time
    and configuring the load impedance to further reject ambient electromagnetic radiation below the predetermined pulse component frequency.

22. A method of receiving light pulses as in claim 21 together with the step of
    absorbing a part of the ambient electromagnetic radiation while simultaneously allowing the pulsed light to pass.

23. A method of receiving light pulses as in claim 22 together with the step of
    sealing the sensor from the atmosphere to prevent condensed moisture from collecting internally and blocking the pulsed light.

* * * * *